R. LIEBAU.
AIR SPRING SUSPENSION.
APPLICATION FILED FEB. 26, 1919.

1,363,798.

Patented Dec. 28, 1920.
2 SHEETS—SHEET 1.

WITNESSES

INVENTOR
Richard Liebau

R. LIEBAU.
AIR SPRING SUSPENSION.
APPLICATION FILED FEB. 26, 1919.

1,363,798.

Patented Dec. 28, 1920.
2 SHEETS—SHEET 2.

WITNESSES

INVENTOR

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AIR-SPRING SUSPENSION.

1,363,798.  Specification of Letters Patent.  Patented Dec. 28, 1920

Application filed February 26, 1919. Serial No. 279,436.

*To all whom it may concern:*

Be it known that I, RICHARD LIEBAU, a citizen of the United States, and a resident of New Haven, in the county of New Haven and State of Connecticut, have made a new and useful Invention in Air-Spring Suspensions, of which the following is a specification.

This invention relates to means for mounting air springs on vehicles such as motor trucks. In some types of motor trucks the steel springs stand outside of the frame of the load platform and an object of this invention is to provide means for mounting air springs on trucks in which the steel springs are thus placed.

In the drawings accompanying this application Figure 1 is a view in end elevation of a device embodying this invention.

Figure 1:
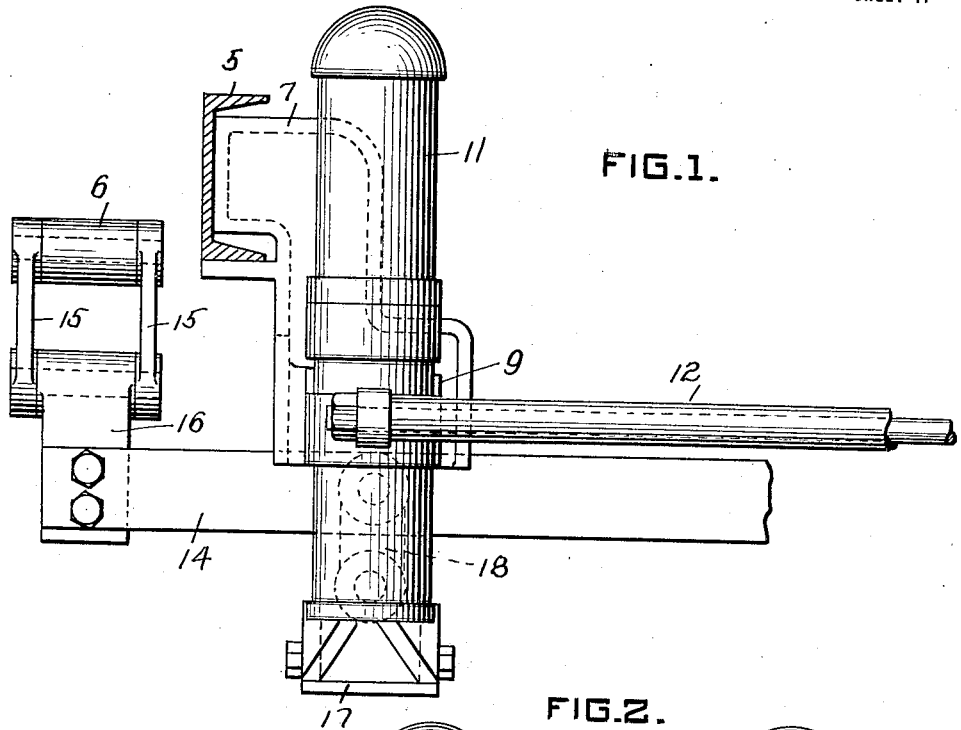
Figure 2:
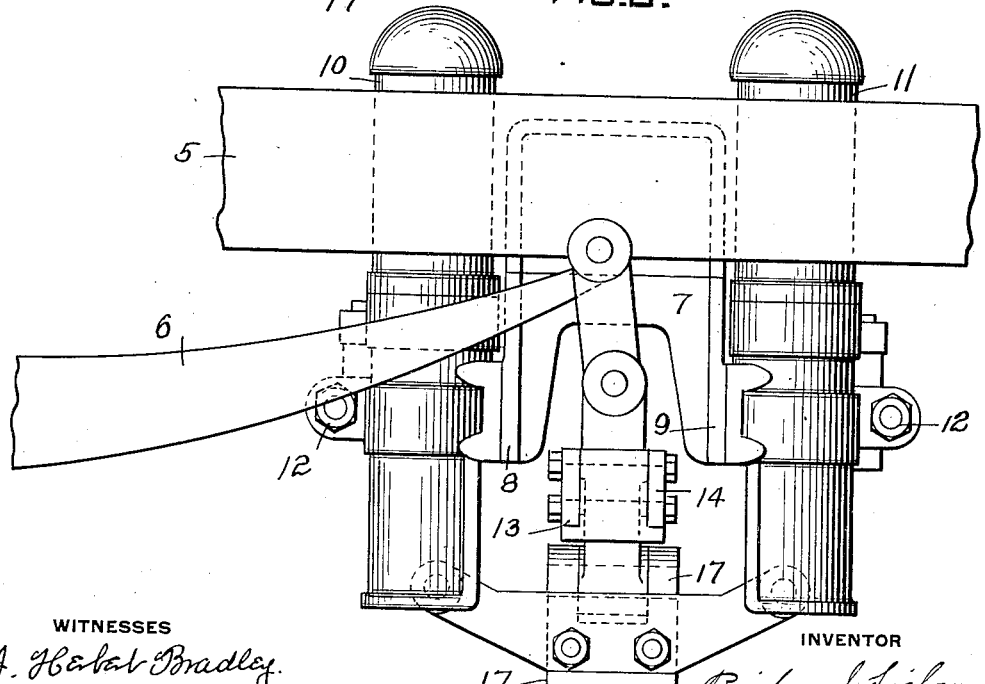
Fig. 2 is a view in side elevation of this device.
Figure 3:
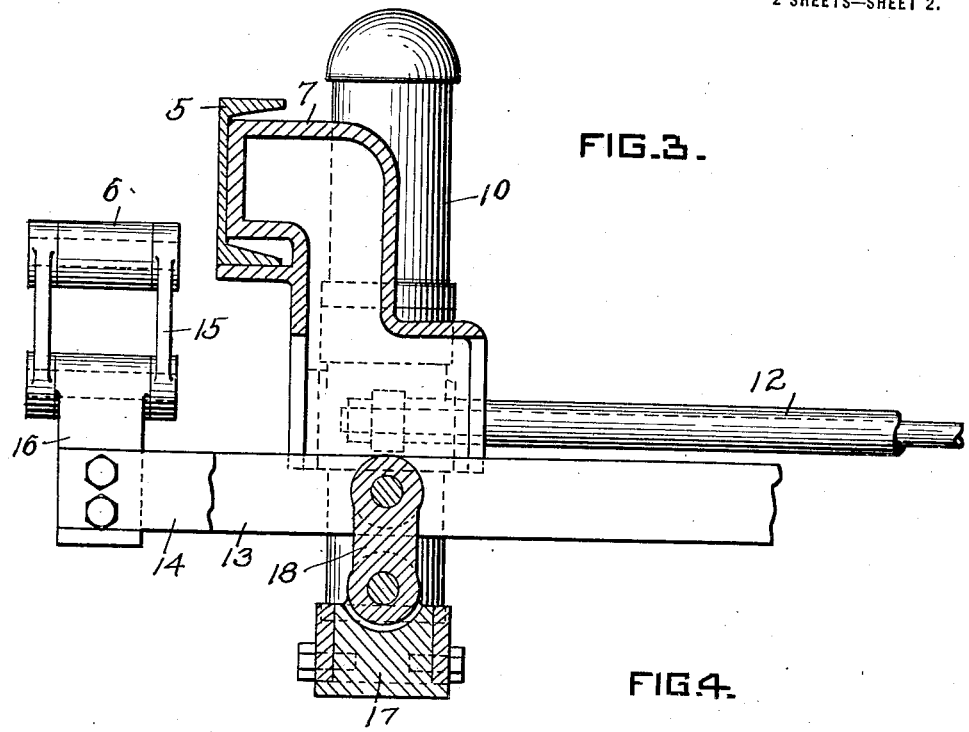
Fig. 3 is a view similar to Fig. 1 with portions of the device shown in section.
Figure 4:
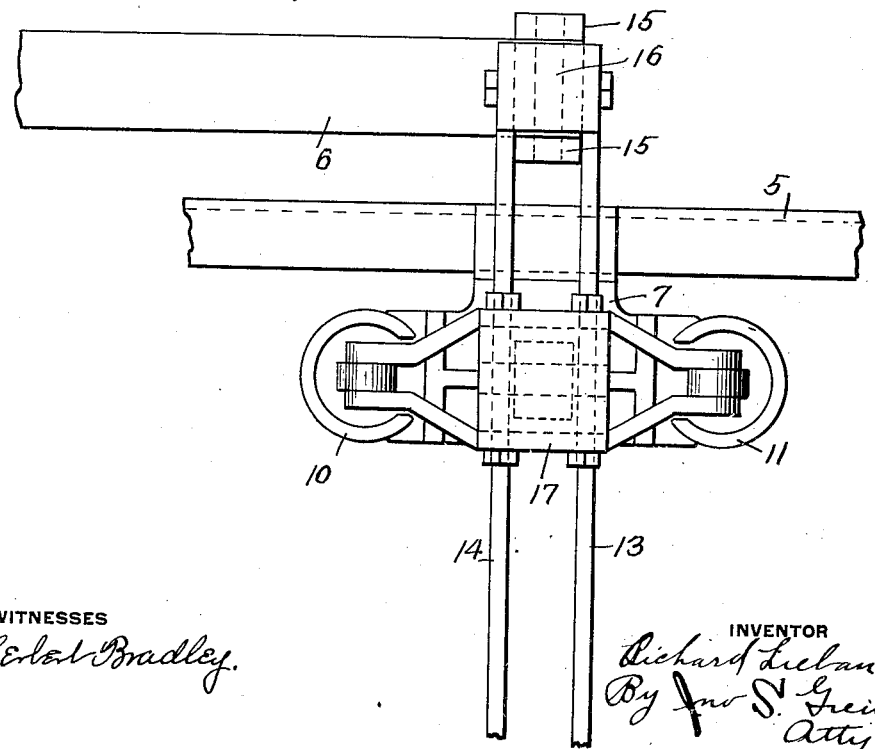
Fig. 4 is a view of the device shown in Figs. 1 and 2 looking up toward the bottom of the device.

5 represents one of the side members in the form of a channel iron of the frame or load platform of a truck in which the steel springs 6 are located outside of the frame as is now common in some types of trucks.

A bracket 7 bolted within the channel iron and depending therefrom is provided with two pads or faces 8 and 9 to which air springs 10 and 11 are bolted.

The air springs on one side of the truck are connected to the air springs on the other side of the same by means of two tie or strengthening rods 12.

A cross member formed of two flat bars 13 and 14 extends across the truck below the ends of the steel springs and is connected to the steel springs by means of shackles 15 which are bolted through the spring eye and to the upper end of a casting 16.

The lower end of casting 16 is bolted in place between bars 13 and 14 and serves as a spacer for holding the bars apart. A yoke formed of two identical bars spaced apart by means of a spacer block 17 to which they are bolted, connects the telescoping bottom members of the air springs together and shackles 18 connect spacer block 17 to the cross bars 13 and 14.

The cross bars 13 and 14 act as levers for connecting the air springs to the steel springs.

If desirable the cushion chambers of the air springs 10 and 11 can be connected together as shown in my copending application Serial Number 279,432.

Having thus described my invention what I claim is—

1. In combination with the frame of a truck and steel springs located outside of said frame, of a plurality of air springs, means for connecting the movable elements of said springs, a cross member extending below the frame and connected to the steel springs and means connecting said cross members with the means connecting the movable elements of said springs.

2. In combination with the frame of a truck or like vehicle and steel springs located outside of said frame of two pairs of air springs located on opposite sides of said frame, means connecting the movable element of each pair of air springs, a strut extending below the frame and shackled to the steel springs, and shackles connecting said strut to the means connecting the movable elements of said air springs.

3. The combination with the frame of a truck or like vehicle and leaf springs located outside of said frame, of two pairs of air springs located on opposite sides of said frame and each having a movable element, means connecting the movable elements of each pair, a cross member consisting of separated bars extending below the frame and shackled to the leaf springs, shackles connecting said cross member with the means connecting the movable elements of said air springs.

In testimony whereof, I have hereunto subscribed my name.

RICHARD LIEBAU.